United States Patent [19]

Nohmi et al.

[11] Patent Number: 4,752,723
[45] Date of Patent: Jun. 21, 1988

[54] CHOPPER CONTROL SYSTEM

[75] Inventors: Makoto Nohmi, Kawasaki; Tadashi Takaoka, Naka; Eiji Kozu, Uma, all of Japan

[73] Assignee: Hitachi, Ltd., Tokyo, Japan

[21] Appl. No.: 15,749

[22] Filed: Feb. 17, 1987

[30] Foreign Application Priority Data

Feb. 21, 1986 [JP] Japan ............................ 61-35140

[51] Int. Cl.$^4$ .................................. H02P 5/00
[52] U.S. Cl. .............................. 318/317; 318/345 R; 318/339; 363/124
[58] Field of Search ........... 318/345 B, 345 C, 345 D, 318/345 G, 415, 416, 139, 599, 306-317, 345 R, 345 E, 326-327, 339; 363/124

[56] References Cited

U.S. PATENT DOCUMENTS

| | | | |
|---|---|---|---|
| 4,114,076 | 9/1978 | Teranish et al. | 318/339 |
| 4,267,492 | 5/1981 | Manners | 318/139 |
| 4,322,667 | 3/1982 | Ohba | 318/139 |
| 4,366,420 | 12/1982 | Omae et al. | 318/139 |
| 4,370,603 | 1/1983 | Franz, Jr. et al. | 318/251 |
| 4,375,603 | 3/1983 | Konrad | 318/376 |
| 4,458,186 | 7/1984 | Kuriyama et al. | 318/345 B |
| 4,500,820 | 2/1985 | Noto et al. | 318/345 R |
| 4,528,487 | 7/1985 | Jimbo et al. | 318/345 R |
| 4,580,083 | 4/1986 | Omae et al. | 318/345 E |
| 4,684,859 | 8/1987 | Nohmi et al. | 318/345 R |

Primary Examiner—William M. Shoop, Jr.
Assistant Examiner—David Martin
Attorney, Agent, or Firm—Antonelli, Terry & Wands

[57] ABSTRACT

A chopper control system for a vehicle driven by a shunt motor. The system is provided with an integrating circuit for generating a command value for the voltage which is to be supplied to an armature of the motor in accordance with the difference between the command value of current which is to be supplied to the armature and the detected value of current flowing through the armature, and with a voltage control circuit for generating a control signal the value of which is proportional to the above command voltage value and is inversely proportional to the power source voltage value. The gate of a chopper switch is on-off controlled by the above control signal, so that the power source voltage value is converted into a voltage value corresponding to the command voltage value and is then supplied to the armature of the motor. By virtue of this arrangement, the armature is supplied with voltage without influence from fluctuations in the power source voltage, and when any wheel slip occurs, the armature current is varied in the direction that causes reduction in the degree of wheel slip.

8 Claims, 3 Drawing Sheets

CHOPPER CONTROL SYSTEM

BACKGROUND OF THE INVENTION

1. Field of the Invention

The present invention relates to a chopper control system, and more particularly to an improvement in a chopper control system which enables reduction of wheel slip.

2. Description of the Prior Art

The rotational speed of a shunt motor changes in proportion to variations in the voltage across the armature when the strength of the field flux is constant.

When a vehicle driven by a shunt motor is normally accelerated or decelerated, it runs with a gradual change in the speed, and therefore, the optimal form of control is an integral one in which the difference between the motor current which flows through the armature and a command current value is integrated, and the supply voltage to the armature is varied in accordance with the thus integrated value.

One of the variable factors in the control of the operation of a vehicle's motor is the fluctuation in the voltage from the power source, for example, from the stringing or line, and this has to be given due consideration. Therefore, in order to obtain a desired tractive force immediately in response to a fluctuation in the line voltage, a conventional chopper control device for a vehicle has a circuit arrangement which exhibits a powerful characteristic of constant current. With this arrangement, however, since the motor current is proportional to the difference (Vm−Em) between the voltage (the mean value) Vm supplied from the chopper control device and the electromotive force Em generated by the armature, whenever any wheel slip takes place between the wheels driven by the motor and the rails on which the vehicle is running, the electromotive force Em will change and, the motor current will also vary in accordance with this change. In general, whenever wheel slip takes place during traction or braking of the vehicle, the motor current has to be reduced temporarily in order to compensate for the wheel slip which has taken place. However, the conventional chopper control device which has a constant current characteristic operates to control the motor current in such a manner as to consistently maintain the same at a constant level, thus failing to reduce the degree of wheel slip, and as a result, acceleration or deceleration control is performed with difficulty in the vicinity of the force limit of adhesion between the wheels and the rails.

SUMMARY OF THE INVENTION

It is an object of the invention to provide a chopper control system which is adapted to reduce wheel slip.

In order to accomplish the above object, a chopper control system for a shunt motor in accordance with the present invention is adapted to determine the conduction ratio $\theta$ for a chopper switch in such a manner that the output voltage (the mean value) Vm from the chopper control system is kept constant even when the voltage from the line fluctuates. More specifically, the conduction ratio $\theta$ for the chopper switch is set to a value which is proportional to the command value Vc of the supply voltage to the motor and is inversely proportional to the line voltage VL. Because the output voltage Vm from the chopper control system is proportional to the product of the conduction ratio $\theta$ and the line voltage VL, by thus setting the value of the conduction ratio $\theta$ to a value which is inversely proportional to the line voltage VL, it is possible to obtain an output voltage Vm from the chopper control system which is independent from the fluctuation in the line voltage and is proportional to the command value Vc.

Because in a normal operation of a vehicle the acceleration or deceleration speed of the vehicle changes gradually, the change in the supply voltage command value Vc is small and, therefore, the chopper output voltage Vm changes gradually. When wheel slip occurs, the rotational speed of the armature rises and thus the induction voltage Em rises rapidly. At this time, however, since the change in the chopper output voltage Vm is gradual, as described above, the armature current will change, that is, decrease in proportion to the difference (Vm−Em). Such a change in the armature current allows the degree of wheel slip to be reduced.

The foregoing and other objects, advantages, manner of operation, and novel features of the present invention will be understood from the following detailed description when read in connection with the accompanying drawings.

DESCRIPTION OF THE PREFERRED EMBODIMENTS

Figure 1:
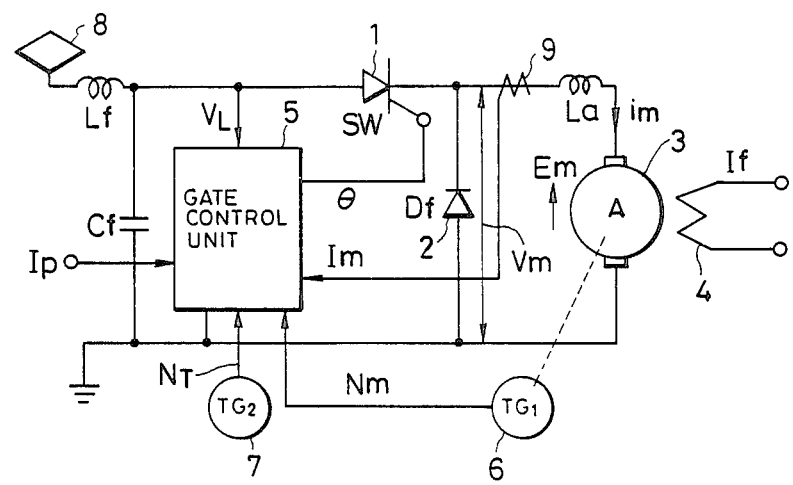
FIG. 1 is a structual view showing a system for driving a motor for a vehicle, to which a chopper control system in accordance with the present invention is applied.

FIG. 1 is a view showing the structure of a system for driving a motor for use in a vehicle, to which a chopper control system in accordance with the present invention is applied. As shown in FIG. 1, the driving system includes a chopper switch 1, a flywheel diode 2, an armature 3 of a shunt motor driven by the chopper control system, a field winding 4, a gate control unit 5 for the chopper switch 1, a detector 6 for detecting the rotational speed of the armature 3, a vehicle speed detector 7, and a pantograph 8 for collecting electric force from the line. Symbols Lf and Cf designate the inductance and the capacitor, respectively, which together constitute a power source filter.

Figure 2:
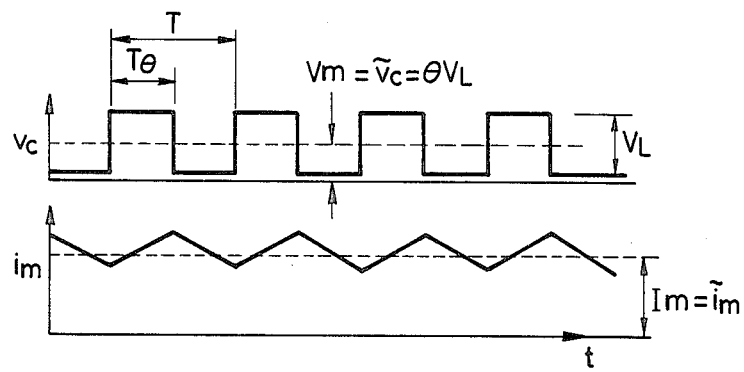
FIG. 2 is a view used in explaining the principle of the operation of the chopper control system.

The gate control unit 5 operates to control the output voltage (Vm−VL·$\theta$) from the chopper control system, which is to be supplied to the armature 3, by varying the conduction ratio θ for the chopper switch 1 relative to the chopping period T, as shown in FIG. 2. In this control unit 5, the conduction ratio θ is controlled in a feedback manner such that a mean value Im of the armature current (motor current) detected by a detector 9 becomes equal to a command value Ip. In addition, the motor rotational speed Nm, the vehicle speed NT, and the power source voltage VL are detected in order to allow stable control of the motor to be performed.

Figure 3:
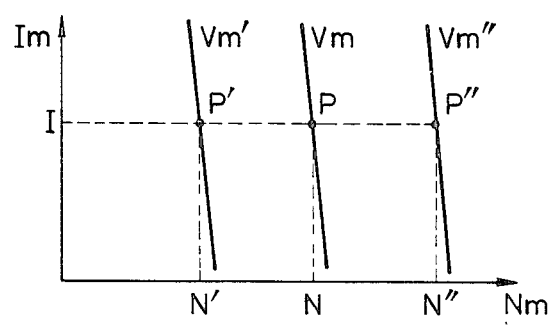
FIG. 3 is a view explaining the characteristics of a shunt motor controlled by the chopper control system.

FIG. 3 shows the relationship between the motor current Im, the output voltage Vm, and the motor speed Nm. The output voltage Vm from the chopper control system is determined in accordance with a desired value of the motor speed Nm. As will be seen from the figure, in a shunt motor, if the chopper output voltage Vm is held constant, motor rotation at a constant speed can be obtained provided that the motor current Im is also constant. This means that if the output voltage Vm is varied at a rate matching any change in the motor speed, e.g. acceleration, the motor speed can be controlled very smoothly. Further, it will be seen from the figure that the motor current Im changes strictly in accordance with changes in the motor speed, i.e., has a shunt characteristic relative thereto.

Figure 4:
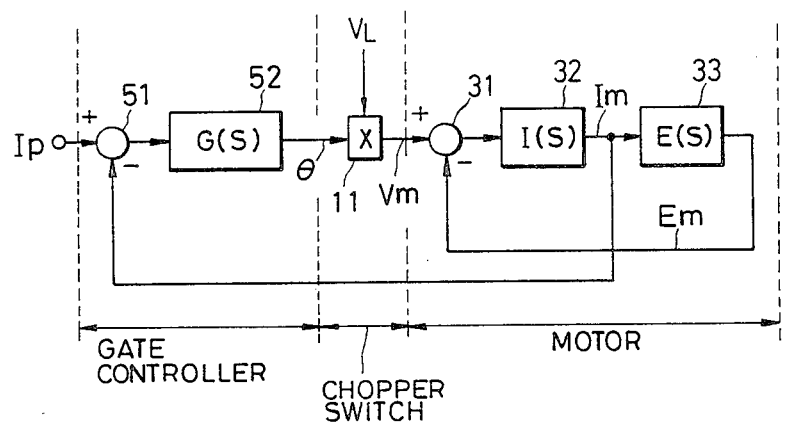
FIG. 4 is a block diagram showing the arrangement of a conventional chopper control system.

FIG. 4 is a block diagram showing the transfer function of a conventional chopper control system. In the figure, reference number 51 designates a circuit for calculating the difference ΔI between the armature current Im and the command value Ip, reference number 52 designates an arithmetic control unit provided for determining the conduction ratio θ for the chopper switch, hereinafter described, on the basis of the thus calculated difference ΔI and comprising differentiation, integration, and proportional control elements, and reference number 11 designates the chopper switch for obtaining the supply voltage Vm to the motor on the basis of the power source voltage VL and the conduction ratio θ. The motor per se is represented by an equivalent circuit having elements 31, 32 and 33.

Figure 5:
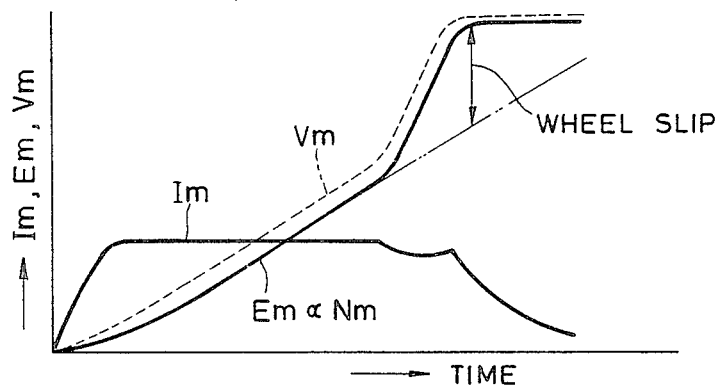
FIG. 5 is a view showing the operational characteristics of a motor driven by the conventional chopper control system.

In the conventional system, since the supply voltage Vm supplied to the motor equals the product of the conduction ratio θ and the power supply voltage VL (Vm=θ·VL) and thus is determined in accordance with the power supply voltage VL, the arrangement is such that the feedback control gain G of the arithmetic control unit 52 is increased and differentiating control is also incorporated, thereby improving the response characteristics of the control system. In addition, the transfer function of the control system is determined such that, even when the power supply voltage VL fluctuates, fluctuation in the current will be small. With the conventional control system described above, however, when wheel slip occurs in the wheels driven by the motor, and thus the induction voltage Em generated by the armature 3 increases temporarily, the system operates to increase the supply voltage Vm to the motor and thus to maintain the current Im at a constant level, as shown in FIG. 5. Such control by the conventional system is not able to prevent slip of the wheel.

Figure 6:
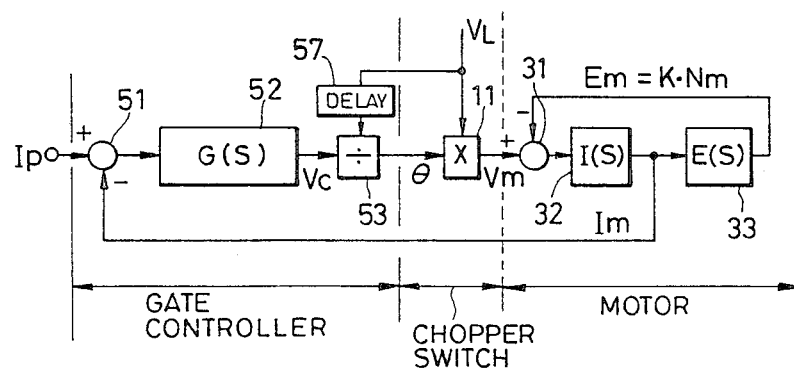
FIG. 6 is a block diagram showing the arrangement of the chopper control system in accordance with the present invention.

FIG. 6 is a block diagram showing the transfer function of the chopper control system in accordance with the present invention. The system in accordance with the invention is adapted to determine the command value Vc of the supply voltage to the motor on the basis of the command value Ip of the motor current and the actual motor current value Im, and to calculate the conduction ratio θ for the chopper switch 11 by dividing the thus determined command voltage value Vc by the power supply voltage (the line voltage) VL in a gate pulse generator 53. This gate pulse generator may be embodied by, for example, a circuit such as that shown in FIG. 8.

Figure 8:
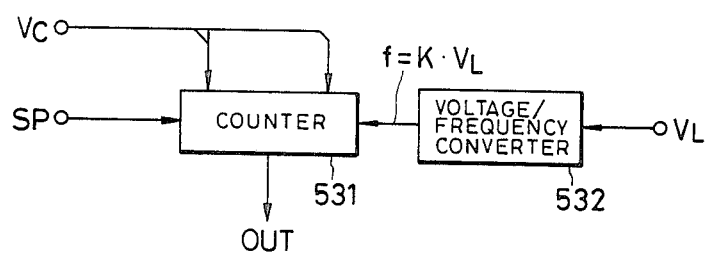
FIG. 8 is a circuit diagram showing an example of the arrangement of a divider element 53 shown in FIG. 6.
Figure 9:
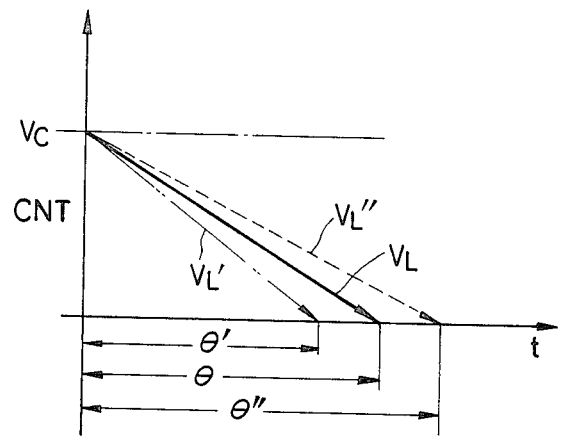
FIG. 9 is a view explaining the operation of the divider element 53.

Referring to FIG. 8, reference numbers 531 and 532 designate respectively a counter and a voltage/frequency converter (VFC) for generating pulses each having a frequency which is proportional to the input voltage. The counter 531 is preset with a value proportional to the command voltage value Vc in response to a set pulse SP generated at the starting point of each chopping period T, and operates to count down the value with reference to count pulses generated from the VFC 532. Thus, the counter 531 keeps the output signal OUT derived therefrom in the on-state until the counted value becomes zero, and turns off the output signal OUT when the counted value reaches zero. The period during which the output signal OUT is kept on is a conduction period of the chopper switch, while a quotient obtained by dividing this conduction period by the corresponding chopper period T is the conduction ratio θ. In the illustrated embodiment, since the frequency of a count pulse generated from the VFC 532 is inversely proportional to the power supply voltage VL, the resulting conduction ratio θ is proportional to the quotient VC/VL, as shown in FIG. 9 (in which the relationship of VL'>VL>VL'' stands). Therefore, reverting to FIG. 6, the output voltage Vm of the chopper switch 11 is set to a value expressed by the following equations:

$$Vm = \theta \cdot VL = Vc$$

which is no longer influenced by the fluctuation in the power supply voltage VL.

Even when such an ideal example of control of the voltage is effected in this manner, however, there is still a fear that a negative resistance component will appear in the total load impedance in the power supply circuit. This negative resistance component might form a resonance circuit in cooperation with the power source filter designated by the symbols Lf and Lc, resulting in an oscillation phenomenon in the power source circuit. In order to prevent such an oscillation phenomenon when performing control of traction of the vehicle, i.e. when performing control of the vehicle's acceleration, a delay element 57 may be provided, for example, in the VFC 532, or in the circuit for detecting the power supply voltage VL as shown in FIG. 6. This delay element may have a simple linear delay function.

Voltage control circuits which may be employed in the present invention are not restricted to the arrangement shown in FIG. 8. Alternatively, a modified circuit such as a circuit which is able to provide an equivalent operation, or a circuit which is of the voltage-feedback type and which performs feedback control may be employed.

By virtue of the above-mentioned arrangement (shown in FIG. 6) of the chopper control system in accordance with the invention, the control of the command voltage value Vc needs not be keenly responsive to fluctuations in the power source voltage, and it is permissible for it to have a gradual response characteristic.

Figure 7:
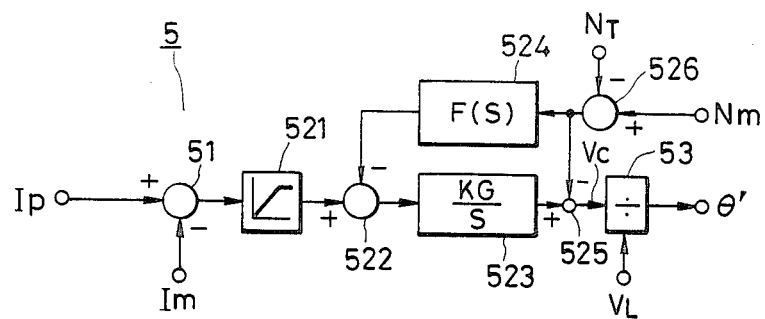
FIG. 7 is a block diagram showing an example of the specific arrangement of a gate control unit 5 of the system in accordance with the present invention.

FIG. 7 is a block diagram embodying the gate control unit 5. As shown in FIG. 7, the control unit 5 includes a difference calculating circuit 51, a limiter circuit 521 for limiting the maximum value of the output from the difference calculating circuit 51, an integration calculating circuit 523, a circuit 526 for detecting the amount of wheel slip on the basis of the vehicle speed NT and the motor speed Nm, a transfer function 524 provided for feedback of the thus detected amount of wheel slip, and feedback calculating circuits 522 and 525 for calculation of the feedback amount of wheel slip. In the actual control of the vehicle, since changes in the motor speed are gradual, the integration calculating circuit 523 does not have to take into consideration the change in the motor voltage Vm and, therefore, it only has to integrate the difference between the command current value Ip and the motor current Im. Further, since the upper limit of acceleration of the motor is limited in accordance with the maximum possible acceleration speed of the vehicle, the arrangement is such that the limiter circuit 521 limits the maximum value input to the integration calculating circuit 523 at a predetermined level, thereby restricting the range of possible change in the command voltage value Vc. Thus, in this embodiment, the gate control unit is adapted to detect the amount of wheel slip, and to vary the value of the command voltage value in accordance with the detected amount of wheel slip, thereby effecting control which enables recovery of adhesion between the wheels and the rails when wheel slip takes place.

Although the above description concerns only the sort of control which is performed during traction, i.e., acceleration of the vehicle, the same control as above can be performed when a regenerative type of control is required, i.e., during deceleration, provided that the relationship between the chopper switch, which is a main circuit member, and the motor is modified accordingly.

Incidentally, in the above embodiments, when traction is started from a state wherein the motor is already rotating at high speed, a long period is required before the current starts to flow with the output voltage from the chopper control system having risen above the motor voltage; however, this problem can be solved by, for example, performing integration utilizing as the initial value the voltage which has already been generated in the motor at the start of traction, or by interrupting the operation of the limiter 521 until the current increases above a certain value.

As will be clear from the foregoing description, the present invention enables stable control of a motor to be performed without being influenced by fluctuation in the power source voltage. In addition, the present invention makes it possible to promptly reduce any wheel slip which takes place in the vehicle, thereby allowing recovery of the normal running condition, and thus enabling safe control over acceleration or deceleration in a region close to the force limit of adhesion between the wheels and the rails.

We claim:

1. A chopper control system for driving a shunt motor comprising:

a chopper switch connected between an armature of said motor and a power supply source;

means for commanding a current value which is to be supplied to said armature;

means for generating a command voltage value which is to be supplied to said armature in accordance with a difference between the commanded current value and a detected value of current flowing through said armature; and control signal generating means responsive to said command voltage value and a value of a voltage from the power supply source for generating a control signal having a value proportional to said command voltage value and inversely proportional to the value of the voltage from the power supply source, said chopper switch being on-off controlled by said control signal to convert said voltage value from the power supply source into a voltage value corresponding to said command voltage value, the thus obtained voltage value being supplied to said armature.

2. A chopper control system according to claim 1, wherein said means for generating said command voltage value comprises:

means for calculating the difference between said commanded current value and the detected current value;

means for limiting the upper limit of the thus calculated difference between said current values at a predetermined value and for outputting the same; and means for integrating the output from said limiting means, said command voltage value being output from said integrating means.

3. A chopper control system according to claim 1, wherein said means for generating said control signal includes:

means for detecting said voltage value from the power supply source; and means for dividing said command voltage value by the thus detected voltage value from the power supply source.

4. A chopper control system according to claim 3, wherein said means for generating said control signal further includes delay means for supplying said detected voltage value from the power supply source to said dividing means.

5. A chopper control system for a vehicle driven by a shunt motor comprising:

a chopper switch connected between the line from which the power source voltage is supplied and an armature of said motor;

means for commanding a current value which is to be supplied to said armature;

means for detecting a value of current flowing through said armature;

means for generating a command voltage value which is to be supplied to said armature in accordance with a difference between the commanded current value and the detected current value; and control signal generating means responsive to said command voltage value and a value of the power source voltage for generating a control signal having a value proportional to said command voltage value and inversely proportional to the value of the power source voltage;

said chopper switch being on-off controlled by said control signal to convert said power source voltage value into a voltage value corresponding to said command voltage value, the thus obtained voltage value being supplied to said armature.

6. A chopper control system according to claim 5, wherein said means for generating said command voltage value comprises:

means for calculating the difference between said commanded current value and said detected current value;
means for limiting the upper limit of the thus calculated difference between said current values at a predetermined value and for outputting the same; and
means for integrating the output value from said limiting means,
said command voltage value being output from said integrating means.

7. A chopper control system according to claim 6, further comprising:
means for detecting the actual speed of said vehicle;
means for detecting the driven speed of said vehicle which is proportional to the rotational speed of said motor;
means for calculating the difference between the actual speed of said vehicle and the driven speed of said vehicle; and
means for calculating the difference between the output value from said limiting means and the function of the calculated difference between the actual speed and the driven speed of said vehicle, the resulting output therefrom being integrated by said integrating means.

8. A chopper control system according to claim 5, wherein said means for generating said control signal comprises:
means for generating pulses each having a frequency which is proportional to said power source voltage value; and
means for repeating at certain periods the action of counting the thus generated pulses, and bringing said control signal into the on-state until the thus counted value reaches a predetermined value which is proportional to said command voltage value, bringing the same into the off-state after said counted value has reached said predetermined value.

* * * * *